United States Patent
Imanaka et al.

(10) Patent No.: US 7,936,137 B2
(45) Date of Patent: May 3, 2011

(54) INVERTER

(75) Inventors: Yoshinori Imanaka, Kyoto (JP); Kenichi Fukumoto, Kyoto (JP)

(73) Assignee: Rohm Co., Ltd. (JP)

( * ) Notice: Subject to any disclaimer, the term of this patent is extended or adjusted under 35 U.S.C. 154(b) by 412 days.

(21) Appl. No.: 12/210,079

(22) Filed: Sep. 12, 2008

(65) Prior Publication Data

US 2009/0066265 A1    Mar. 12, 2009

(30) Foreign Application Priority Data

Sep. 12, 2007  (JP) .................................. 2007-237068

(51) Int. Cl.
  H05B 39/00  (2006.01)
  H05B 39/04  (2006.01)
(52) U.S. Cl. ......................... 315/354; 315/291
(58) Field of Classification Search .................. 315/276, 315/279, 282, 287, 291, 209 R, 307, 354
See application file for complete search history.

(56) References Cited

U.S. PATENT DOCUMENTS

| | | | | |
|---|---|---|---|---|
| 7,095,635 B2 * | 8/2006 | Fukumoto | .................. | 363/21.09 |
| 7,236,377 B2 * | 6/2007 | Fukumoto | .................. | 363/21.09 |
| 7,531,970 B2 * | 5/2009 | Yu et al. | ......................... | 315/291 |
| 7,579,784 B2 * | 8/2009 | Araki et al. | ............... | 315/209 R |

FOREIGN PATENT DOCUMENTS

JP    2003-323994    11/2003

* cited by examiner

*Primary Examiner* — Douglas W Owens
*Assistant Examiner* — Minh D A
(74) *Attorney, Agent, or Firm* — Cantor Colburn LLP

(57) ABSTRACT

A soft start circuit generates a soft start voltage Vss which changes with time at a starting time of lighting an EEFL. A pulse width modulator generates a PWM signal Vpwm whose duty ratio is feedback-controlled so that a feedback voltage Vfb corresponding to an output voltage Vdrv of an inverter conforms to the soft start voltage Vss. A logical control unit performs switching control of a voltage of a primary coil of a transformer on the basis of the PWM signal Vpwm from the pulse width modulator. The soft start circuit executes at least one striking operation in which the soft start voltage Vss is raised with time, lowered when being reached to a first voltage level VH, and raised again when being lowered to a second voltage level VL lower than the first voltage level VH.

9 Claims, 4 Drawing Sheets

INVERTER

BACKGROUND OF THE INVENTION

1. Field of the Invention

The present invention relates to an inverter which supplies a driving voltage to an external electrode fluorescent lamp.

2. Description of the Related Art

In recent years, liquid crystal displays capable of reducing in thickness and increasing in size have become popular in place of cathode ray tube displays. In a liquid crystal display, a plurality of cold cathode fluorescent lamps (hereinafter, referred to as CCFL) or external electrode fluorescent lamps (hereinafter, referred to as EEFL) are arranged on the back of a liquid crystal panel in which video is displayed and are made to emit light as a backlight.

For driving the CCFL or EEFL, there is used an inverter (DC (direct current)/AC (alternating current) converter) which boosts, for example, a DC voltage of approximately 12 V and outputs as an AC voltage. The inverter converts an electric current flowing in the CCFL to a voltage and feeds back to a control circuit, and performs ON/OFF control of a switching element on the basis of the fed-back voltage. For example, a driving technique of the CCFL based on such an inverter is disclosed in Patent Document 1 (Japanese Patent Application (Laid open) No. 2003-323994).

There is a problem in that an EEFL is difficult to be lighted as compared with other fluorescent lamps such as a CCFL. As to whether or not the EEFL is lighted, it depends on probability event; and therefore, conventionally, lighting probability is raised by repeating a starting operation of the inverter several times in order to light the EEFL. More specifically, in the known inverter, a high voltage is applied to the inverter for the purpose of striking the EEFL, and an operation that performs shutdown is repeated.

In the known technique, in addition to a control circuit of the inverter, an externally mounted circuit needs to be provided for repeating the shutdown and the starting operation of the control circuit; and therefore, there is a problem in that it becomes large in circuit area or it becomes high cost.

SUMMARY OF THE INVENTION

The present invention has been made in view of such a problem, and a general purpose of the present invention is to provide a control circuit of an inverter which is low cost or has a small area, and is capable of lighting an EEFL surely.

An embodiment of the present invention relates to a control circuit of an inverter which drives an external electrode fluorescent lamp connected to a secondary coil of a transformer. The control circuit includes a soft start circuit which generates a soft start voltage that changes with time at a starting time of lighting the external electrode fluorescent lamp; a pulse modulator which receives a feedback voltage corresponding to an output voltage of the inverter and the soft start voltage, and generates a pulse signal whose duty ratio is feedback-controlled so that the feedback voltage conforms to the soft start voltage; and a logical control unit which performs switching control of a voltage of a primary coil of the transformer on the basis of the pulse signal from the pulse modulator. The soft start circuit executes at least one striking operation in which the soft start voltage is raised with time, lowered when being reached to a first voltage level, and raised again when being lowered to a second voltage level smaller than the first voltage level.

According to the embodiment, striking of the EEFL is performed by using the soft start circuit; and therefore, an external circuit for striking is not required and the EEFL can be lighted surely by a simple configuration.

The first voltage level and the second voltage level may be set to different values for each cycle of repetition.

The soft start circuit may be that the number of repetitions of the striking operation is selectable from a plurality of values. In this case, it is possible to set the number of the striking operations in response to lighting probability of the EEFL, and to light the EEFL surely.

The soft start circuit may include a capacitor whose potential at one end is fixed; a charging and discharging circuit which charges and discharges the capacitor; a voltage comparison unit which compares the soft start voltage at the other end of the capacitor with first and second voltage levels; and a charging and discharging control unit which switches a charging state and a discharging state of the charging and discharging circuit on the basis of a comparison result by the voltage comparison unit. The charging and discharging control unit may have a counter which counts the number of switchings between the charging state and the discharging state of the charging and discharging circuit on the basis of the comparison result by the voltage comparison unit.

In this case, the number of the striking operations can be controlled by using a count value by the counter.

The charging and discharging control unit may fix the charging and discharging circuit to the charging state when a count value of the counter is a predetermined value or more. In this case, when the count value reaches the predetermined value, the soft start voltage raises, and the striking operation can be stopped.

The voltage comparison unit may include a first comparator which compares the soft start voltage with the first voltage level; and a second comparator which compares the soft start voltage with the second voltage level. The charging and discharging control unit may include a flip-flop to which output signals of the first and the second comparators are inputted, switch the states of the charging and discharging circuit on the basis of an output signal of the flip-flop, and make the counter execute counting based on the output signal of the flip-flop.

The charging and discharging circuit may include a charging circuit which supplies a charging current to a capacitor; and a discharging circuit which is switchable to ON or OFF and withdraws a discharging current larger than the charging current from the capacitor in an ON state. The charging and discharging control unit may perform ON/OFF control of the discharging circuit on the basis of an output signal of the counter and the output signal of the flip-flop.

Other embodiment of the present invention is an inverter. The inverter includes a transformer; the above mentioned control circuit which performs switching control of a voltage of a primary coil of the transformer; and a voltage detection unit which detects an output voltage of the inverter, the voltage being generated at a secondary coil of the transformer, and outputs the feedback voltage to the control circuit in response to the output voltage.

Still other embodiment of the present invention is a light emitting device. This device includes an external electrode fluorescent lamp; and the above mentioned inverter which supplies an output voltage thereof to the external electrode fluorescent lamp.

Further other embodiment of the present invention relates to a control method of an inverter which drives an external electrode fluorescent lamp. The control method includes: generating a soft start voltage which changes with time at a starting time of lighting the external electrode fluorescent lamp; generating a pulse signal whose duty ratio is feedback-controlled so that a feedback voltage corresponding to an output voltage of the inverter conforms to the soft start voltage; and performing switching control of a voltage of a primary coil of a transformer of the inverter on the basis of the pulse signal. A plurality of operations which increase or decrease the soft start voltage at a starting time of lighting the external electrode fluorescent lamp are repeated.

Still further other embodiment of the present invention is a liquid crystal display. The liquid crystal display includes a liquid crystal panel, and a plurality of the above mentioned light emitting devices arranged on the back of the liquid crystal panel.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
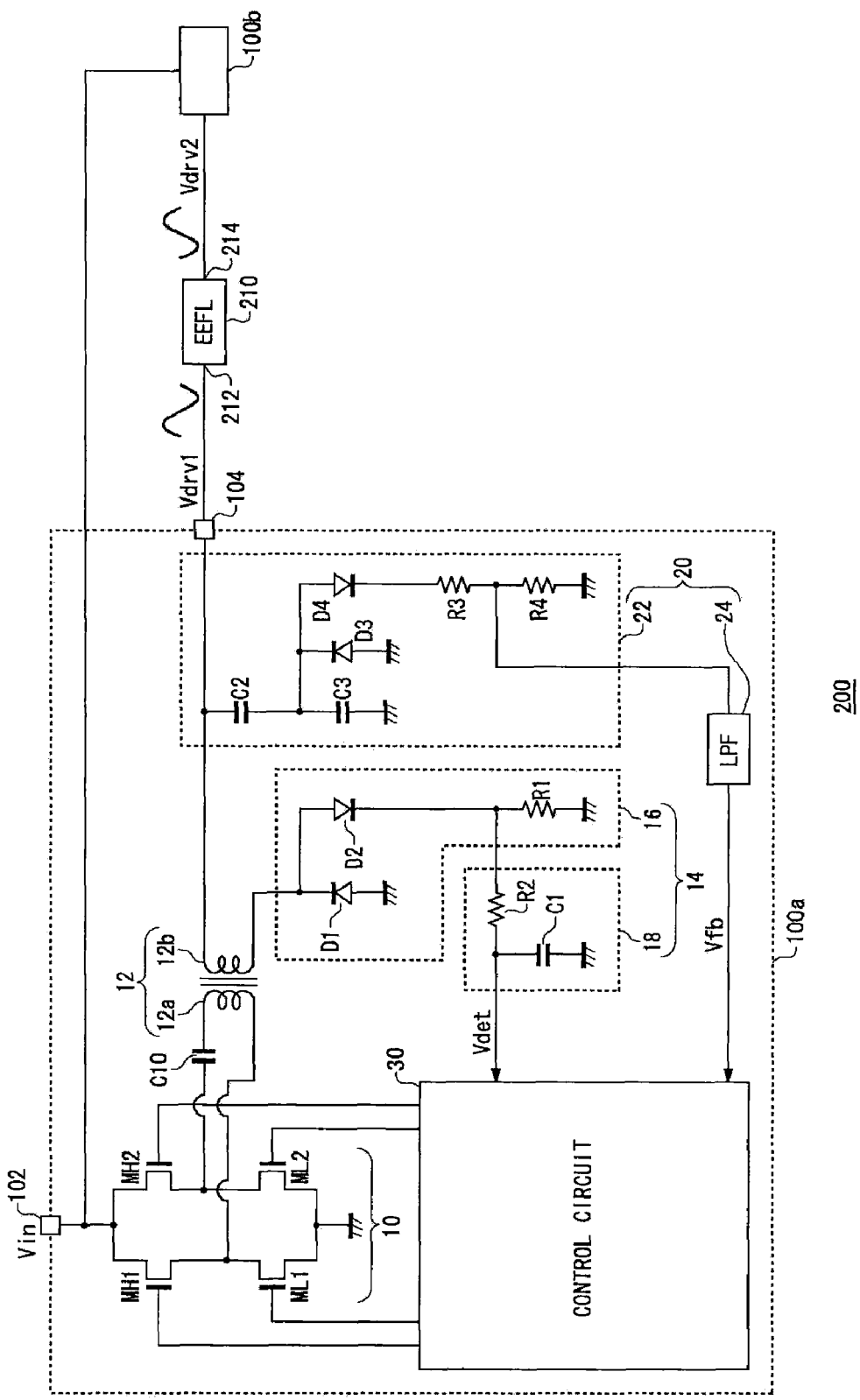
FIG. 1 is a circuit diagram showing a configuration of a light emitting device according to a preferred embodiment of the present invention.
Figure 2:
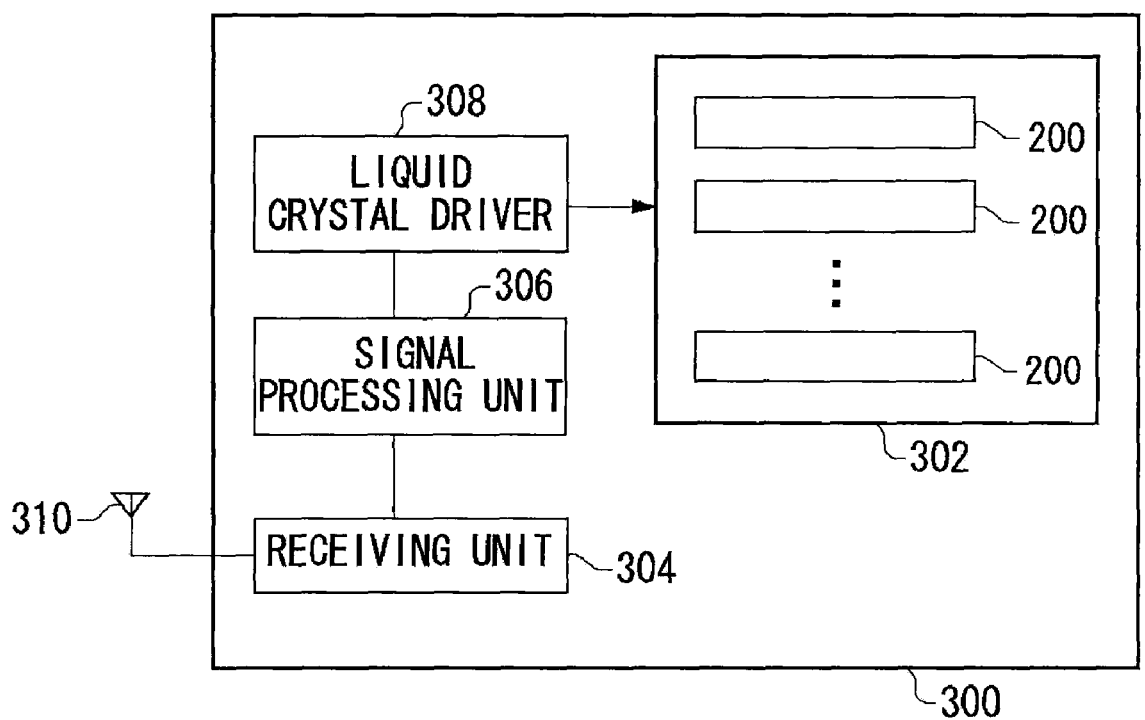
FIG. 2 is a block diagram showing a configuration of a liquid crystal display on which the light emitting device shown in FIG. 1 is mounted.

FIG. 1 is a circuit diagram showing a configuration of a light emitting device 200 according to a preferred embodiment of the present invention. FIG. 2 is a block diagram showing a configuration of a liquid crystal television 300 on which the light emitting device 200 shown in FIG. 1 is mounted. The liquid crystal display 300 is connected to an antenna 310. The antenna 310 receives broadcast waves and outputs received signals to a receiving unit 304. The receiving unit 304 detects and amplifies the received signals and outputs to a signal processing unit 306. The signal processing unit 306 outputs image data which is obtained by demodulating modulated data to a liquid crystal driver 308. The liquid crystal driver 308 outputs the image data to a liquid crystal panel 302 for each scanning line, and displays video and image. A plurality of the light emitting devices 200 are arranged on the back of the liquid crystal panel 302 as a backlight. The light emitting device 200 according to the preferred embodiment can be preferably used as the backlight of such liquid crystal panel 302. Getting back to FIG. 1, the configuration and the operation of the light emitting device 200 will be described in detail below.

The light emitting device 200 according to the preferred embodiment includes an EEFL 210, a first inverter 100a, and a second inverter 100b. The EEFL 210 is arranged on the back of the liquid crystal panel 302. The first inverter 100a and the second inverter 100b are DC/AC converters which convert an input voltage Vin, which is outputted from a DC power source and inputted to an input terminal 102, to AC voltages, boost the AC voltages, and supply a first driving voltage Vdrv1 and a second driving voltage Vdrv2 to a first terminal 212 and a second terminal 214 of the EEFL 210, respectively. The first driving voltage Vdrv1 and the second driving voltage Vdrv2 are AC voltages which become reverse phases with each other.

In FIG. 1, one EEFL 210 is shown; however, a plurality of the EEFLs may be arranged in parallel. Hereinafter, configurations of the first inverter 100a and the second inverter 100b according to the present preferred embodiment will be described. Since the first inverter 100a and the second inverter 100b are the same configurations, the description will be made without discriminating between the both inverters, which are generally referred to as an inverter 100.

The inverter 100 includes an H bridge circuit 10, a transformer 12, a current-voltage conversion unit 14, a driving voltage detection unit 20, a control circuit 30, and a capacitor C19.

The H bridge circuit 10 includes four power transistors of a first high side transistor MH1, a first low side transistor ML1, a second high side transistor MH2, and a second low side transistor ML2.

The first high side transistor MH1 has one end connected to the input terminal 102 to which the input voltage Vin is applied, and the other end connected to a first terminal of a primary coil 12a of the transformer 12. The first low side transistor ML1 has one end connected to a grounding terminal whose potential is fixed, and the other end connected to the first terminal of the primary coil 12a. The second high side transistor MH2 has one end connected to the input terminal 102, and the other end connected to a second terminal of the primary coil through the capacitor C10 for blocking DC. The second low side transistor ML2 has one end connected to the grounding terminal, and the other end connected to the second terminal of the primary coil 12a through the capacitor C10 for blocking DC.

The current-voltage conversion unit 14 is provided on a current path of a secondary coil 12b of the transformer 12. The current-voltage conversion unit 14 converts a current flowing through the secondary coil 12b, that is, a current flowing through the EEFL 210 to a voltage, and outputs the voltage as a detection voltage Vdet. The current-voltage conversion unit 14 includes a rectifying circuit 16 and a filter 18.

The rectifying circuit 16 includes a first diode D1, a second diode D2, and a first resistor R1. The first diode D1 has an anode connected to a ground, and a cathode connected to one end of the secondary coil 12b. An anode of the second diode D2 is connected to the cathode of the first diode D1. The first resistor R1 is provided between a cathode of the second diode D2 and the ground. An AC current flowing through the secondary coil 12b is half-wave rectified by the first diode D1 and the second diode D2 and flows through the first resistor R1. A voltage drop proportional to the current flowing through the secondary coil 12b is generated across the first resistor R1. The rectifying circuit 16 outputs the voltage drop across the first resistor R1.

The filter 18 is a low pass filter including a second resistor R2 and a first capacitor C1. The filter 18 feeds back a detection voltage Vdet in which a high frequency component of the output voltage of the rectifying circuit 16 is removed to the control circuit 30.

The driving voltage detection unit 20 is configured by including a rectifying circuit 22 and a filter 24, and is provided between an output terminal 104 of the inverter 100 and the ground. The driving voltage detection unit 20 generates a DC feedback voltage Vfb corresponding to a driving voltage Vdrv outputted from the inverter 100, and feeds back to the control circuit 30.

The rectifying circuit 22 includes a second capacitor C2, a third capacitor C3, a third diode D3, a fourth diode D4, a third resistor R3, and a fourth resistor R4. The second capacitor C2 and the third capacitor C3 are connected in series between the output terminal 104 and the ground. The third diode D3 has an anode connected to the ground, and a cathode connected to a node (connection point) between the second capacitor C2 and the third capacitor C3. Furthermore, the fourth diode D4 has an anode connected to the cathode of the third diode D3. The third resistor R3 and the fourth resistor R4 are connected in series between a cathode of the fourth diode D4 and the ground. The driving voltage Vdrv outputted from the output terminal 104 is the AC voltage, and is divided by the second capacitor C2 and the third capacitor C3. The divided driving voltage Vdrv is half-wave rectified by the third diode D3 and the fourth diode D4, and is further divided by the third resistor R3 and the fourth resistor R4. The driving voltage divided by the third resistor R3 and the fourth resistor R4 is outputted to the filter 24.

The filter 24 feeds back the feedback voltage Vfb in which a high frequency component of a signal outputted from the rectifying circuit 22 is removed to the control circuit 30. The filter 24 may be configured by using the resistor and the capacitor as in the filter 18.

The control circuit 30 performs ON/OFF control of the first high side transistor MH1, the first low side transistor ML1, the second high side transistor MH2, and the second low side transistor ML2 in the H bridge circuit 10 on the basis of the fed-back detection voltage Vdet and the feedback voltage Vfb. A switching voltage is supplied to the primary coil 12a of the transformer 12 by the control of the H bridge circuit 10. As a result, energy conversion is carried out by the transformer 12, and the first driving voltage Vdrv1 is supplied to the EEFL 210 connected to the secondary coil 12b.

Figure 3:
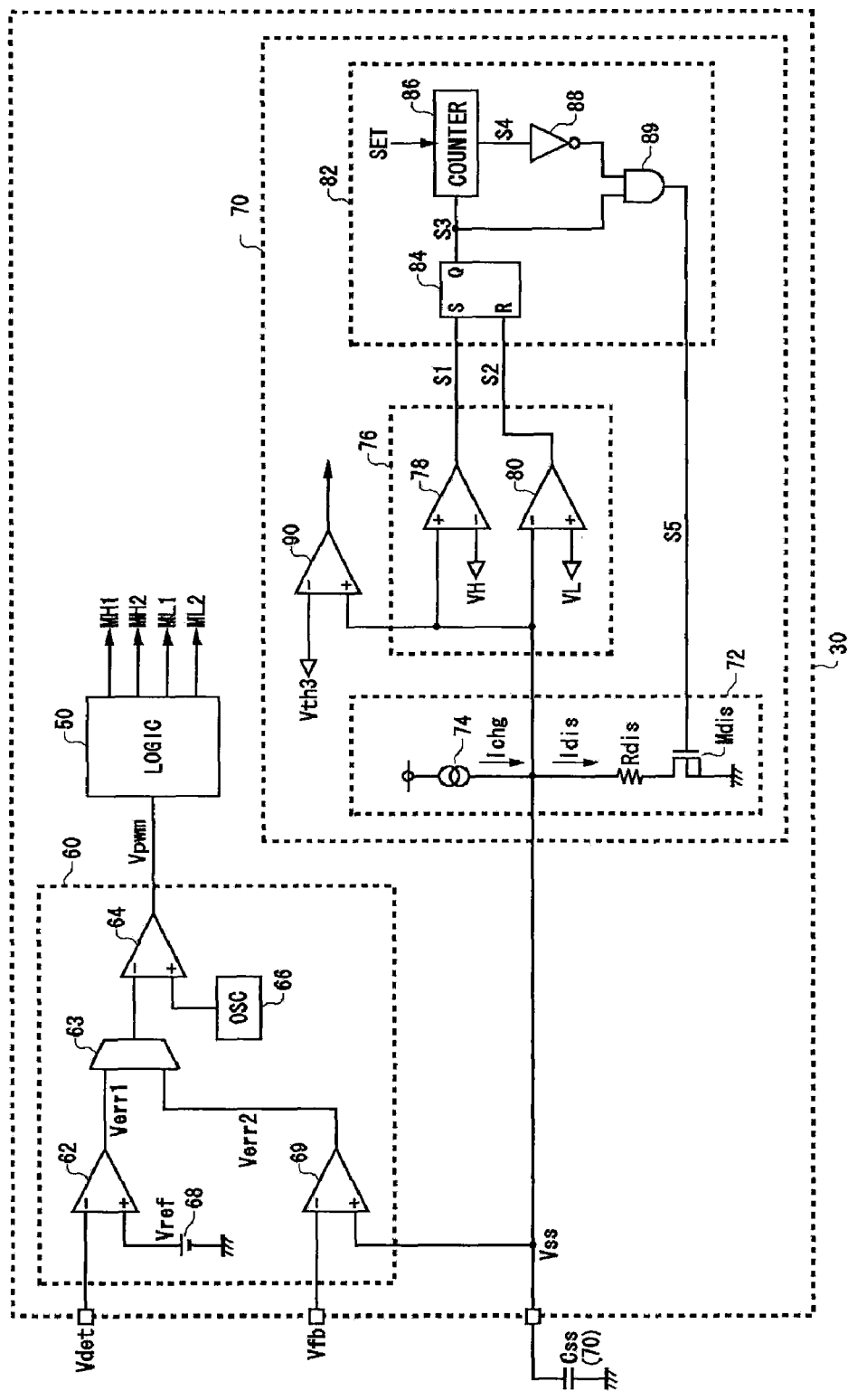
FIG. 3 is a circuit diagram showing a configuration of a control circuit according to the present preferred embodiment.

Hereinafter, a configuration of the control circuit 30 will be described. FIG. 3 is a circuit diagram showing the configuration of the control circuit 30 according to the present preferred embodiment.

The control circuit 30 is a functional IC monolithically integrated on one semiconductor substrate, which includes a pulse width modulator 60, a logical control unit 50, and a soft start circuit 70. The control circuit 30 controls the switching voltage to be supplied to the transformer 12 of the inverter 100 by performing ON/OFF of the transistors MH1, MH2, ML1, and ML2 of the H bridge circuit 10 which is connected externally.

The pulse width modulator 60 has two feedback loops, that is, a first feedback loop that uses the detection voltage Vdet corresponding to a lamp current (current of the secondary coil 12b of the transformer 12), and a second feedback loop that uses the feedback voltage Vfb corresponding to the driving voltage Vdrv of the inverter 100. The control circuit 30 performs so-called current dimming by using the first feedback loop, and executes a soft start by using the second feedback loop.

First, the first feedback loop will be described. The pulse width modulator 60 generates a pulse signal in which a duty ratio is feedback-controlled so that the detection voltage Vdet corresponding to the current of the secondary coil 12b of the transformer 12, that is, the lamp current flowing through the EEFL 210 comes close to a reference voltage Vref by using the first feedback loop. The first feedback loop is formed by an error amplifier 62, a selector 63, a pulse width modulation comparator (hereinafter, referred to as PWM (pulse width modulation) comparator) 64, an oscillator 66, and a voltage supply 68.

The voltage supply 68 generates the reference voltage Vref. The voltage supply 68 generates the reference voltage Vref determined in response to emission luminance of the EEFL 210. The detection voltage Vdet fed back from the current-voltage conversion unit 14 is inputted to an inversion input terminal of the error amplifier 62, and the reference voltage Vref outputted from the voltage supply 68 is inputted to a non-inversion input terminal. The error amplifier 62 outputs an error voltage Verr1 corresponding to an error between the detection voltage Vdet and the reference voltage Vref. In addition, the reference voltage Vref may be supplied externally. The error voltage Verr1 is inputted to an inversion input terminal of the PWM comparator 64 through the selector 63.

The oscillator 66 generates a triangular wave shaped or a sawtooth wave shaped triangular wave signal Vosc having a predetermined frequency. The PWM comparator 64 compares the error voltage Verr1 outputted from the error amplifier 62 with the triangular wave signal Vosc outputted from the oscillator 66. The PWM comparator 64 generates a pulse signal which becomes a high level when the comparison result is Verr1<Vosc, and a low level when the comparison result is Verr1>Vosc. The pulse signal is a pulse width modulation signal in which the duty ratio is feedback-controlled so that the detection voltage Vdet comes close to the reference voltage Vref. Hereinafter, this pulse signal is referred to as a PWM signal Vpwm. The PWM signal Vpwm is inputted to the logical control unit 50.

The logical control unit 50 performs ON/OFF control of the first high side transistor MH1, the first low side transistor ML1, the second high side transistor MH2, and the second low side transistor ML2 of the H bridge circuit 10 on the basis of the duty ratio of the PWM signal Vpwm. As a result that the H bridge circuit 10 is switching-controlled, the input voltage Vin that is a DC voltage is converted to an AC voltage and is outputted as the driving voltage Vdrv.

Next, the second feedback loop will be described. The second feedback loop is formed by the soft start circuit 70, an error amplifier 69, the selector 63, the PWM comparator 64, and the oscillator 66.

The soft start circuit 70 is a block which controls a soft start that gradually raises the output voltage Vdrv of the inverter 100 at a starting time of lighting the EEFL 210. The soft start circuit 70 generates a soft start voltage Vss whose voltage value changes with time at the starting time of lighting the EEFL 210.

The soft start voltage Vss is outputted to the pulse width modulator 60. The error amplifier 69 amplifies an error of the feedback voltage Vfb corresponding to the soft start voltage Vss and the driving voltage Vdrv of the inverter 100. An error voltage Verr2 generated by the error amplifier 69 is inputted to the PWM comparator 64 through the selector 63. The PWM comparator 64 compares the error voltage Verr2 outputted from the error amplifier 69 with the triangular wave signal Vosc outputted from the oscillator 66. The PWM comparator 64 generates a PWM signal Vpwm which becomes a high level when the comparison result is Verr2<Vosc, and a low level when the comparison result is Verr2>Vosc. The duty ratio of the PWM signal Vpwm generated by the second feedback loop is feedback-controlled so that the feedback voltage Vfb matches the soft start voltage Vss.

Switching of the first feedback loop and the second feedback loop is performed by the selector 63. The selector 63 may be controlled by a state machine, or may be controlled on the basis of a signal showing presence or absence of lighting of the EEFL 210. Alternatively, it may be a minimum value circuit which selects a smaller one in voltage level of the two error voltages Verr1 and Verr2. Alternatively, it may be configured that the PWM comparator 64 is a three input comparator and the selector 63 is not provided. That is, various known techniques may be used for switching of soft start control and current dimming control, and the switching technique is not particularly limited.

The soft start circuit 70 executes at least one striking operation in which the soft start voltage Vss is raised with time, lowered when being reached to a first voltage level VH, and raised again when being lowered to a second voltage level VL smaller than the first voltage level VH.

The soft start circuit 70 is configured such that the number of repetitions n of the striking operation is selectable from a plurality of values. For example, it is preferable that n is selectable from any of 1, 2, 3, and 4.

The soft start circuit 70 includes a capacitor Css, a charging and discharging circuit 72, a voltage comparison unit 76, and a charging and discharging control unit 82.

The capacitor Css has one end connected to the ground and its potential is fixed. The charging and discharging circuit 72 charges or discharges by supplying a charging current Ichg to the capacitor Css or by withdrawing a discharging current Idis. The voltage comparison unit 76 compares the soft start voltage Vss at the other end of the capacitor Css with the first voltage level VH and the second voltage level VL. The charging and discharging control unit 82 switches a charging state and a discharging state of the charging and discharging circuit 72 on the basis of the comparison result by the voltage comparison unit 76.

More specifically, the voltage comparison unit 76 includes a first comparator 78 which compares the soft start voltage Vss with the first voltage level VH, and a second comparator 80 which compares the soft start voltage Vss with the second voltage level VL. The charging and discharging control unit 82 includes an RS flip-flop 84 in which output signals S1 and S2 of the first comparator 78 and the second comparator 80 are inputted to a set terminal and a reset terminal, respectively. The charging and discharging control unit 82 switches a state of the charging and discharging circuit 72 on the basis of an output signal S3 of the flip-flop 84.

The charging and discharging control unit 82 includes a counter 86. The counter 86 counts the number of switchings between the charging state and the discharging state of the charging and discharging circuit 72 on the basis of the comparison result of the voltage comparison unit 76. The output signal S3 of the flip-flop 84 is inputted to the counter 86, which executes counting based on level transition of the signal S3.

The charging and discharging circuit 72 includes a charging current supply 74 which supplies the charging current Ichg to the capacitor Css, and a discharging circuit which is switchable to ON or OFF and withdraws the discharging current Idis from the capacitor Css at an ON state. The discharging current Idis is set to be larger than the charging current Ichg. The discharging circuit includes a discharge resistor Rdis and a discharge transistor Mdis, and ON/OFF states of the discharging circuit are switched in response to ON/OFF of the discharge transistor Mdis. When the discharge transistor Mdis is OFF, the capacitor Css is charged by the charging current Ichg. When the discharge transistor Mdis is ON, the capacitor Css is discharged by a difference current (Idis-Ichg). The charging and discharging control unit 82 performs ON/OFF control of the discharge transistor Mdis on the basis of an output signal of the counter 86 and the output signal S3 of the flip-flop 84.

The charging and discharging control unit 82 fixes the charging and discharging circuit 72 to be the charging state when a count value of the counter 86 is a predetermined value or more. The predetermined value is preferable to be adjustable in response to a setting signal SET from the outside. When the count value reaches the predetermined value, the discharge transistor Mdis is OFF, the soft start voltage Vss is raised, and the striking operation is stopped. In the preferred embodiment, the predetermined value is set to 3.

An output S4 of the counter 86 becomes a high level when the count value reaches the predetermined value. The output of the counter 86 is logically inverted by a NOT gate 88. An AND gate 89 outputs logical multiplication of output signals of the flip-flop 84 and the NOT gate 88. An output signal S5 of the NOT gate 88 and the AND gate 89 is inputted to a gate of the discharge transistor Mdis.

A third comparator 90 compares the soft start voltage Vss with a predetermined third voltage level Vth3. The third voltage level Vth3 is set higher than the first voltage level VH. When the comparison result becomes Vss>Vth3, an output signal S6 of the third comparator 90 becomes a high level, and completion of the soft start and the striking operation is notified to other circuit block.

Figure 4:
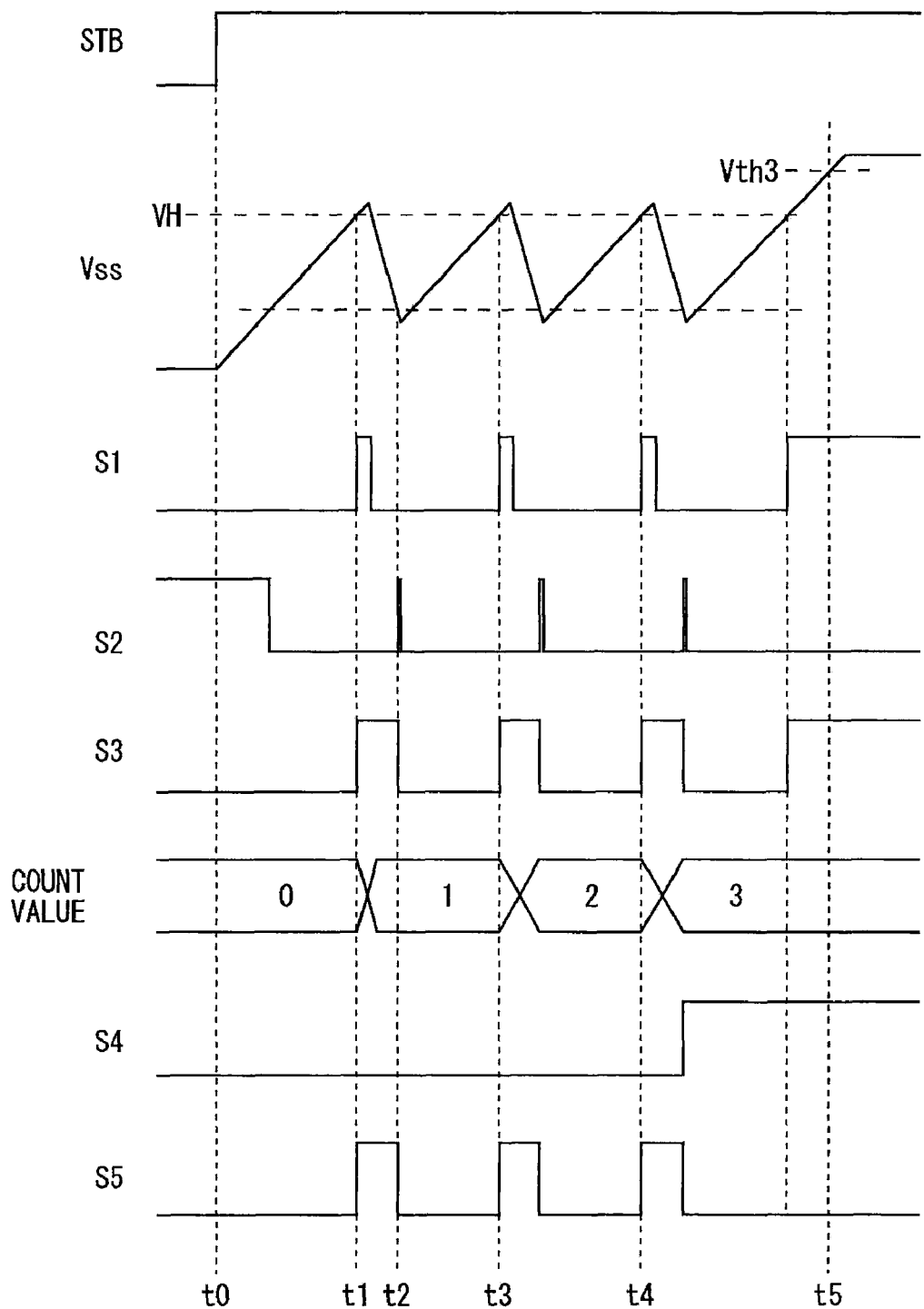
FIG. 4 is a time chart showing an operation state at a time when the control circuit shown in FIG. 3 starts.

The above mention is the configuration of the inverter 100. Next, the operation of the inverter 100 will be described. FIG. 4 is a time chart showing an operation state at a time when the control circuit 30 shown in FIG. 3 starts.

At a time t0, a standby signal STB becomes a high level and starting of the inverter 100 is directed. When the standby signal STB becomes the high level, the charging and discharging circuit 72 is set to a charging state, and the soft start voltage Vss begins to raise.

At a time t1, when the soft start voltage Vss reaches a first voltage level VH, the output signal S1 of the first comparator 78 becomes a high level, the flip-flop 84 is set, the signal S3 becomes a high level, and the count value of the counter 86 becomes 1. When the signal S3 becomes the high level, the gate signal S5 of the discharge transistor Mdis becomes a high level, and the charging and discharging circuit 72 is set to a discharging state. As a result, the soft start voltage Vss begins to lower.

At a time t2, when the soft start voltage Vss lowers to a second voltage level VL, the output signal S2 of the second comparator 80 becomes a high level, the flip-flop 84 is reset, the signal S3 becomes a low level, and the charging and discharging circuit 72 is set again to the charging state.

At a time t3, when the soft start voltage Vss reaches the first voltage level VH again, the output signal S3 of the flip-flop 84 becomes the high level, and the count value increases by 1.

At a time t4, when the output signal S3 of the flip-flop 84 becomes the high level again by repeating similar operations, the count value increases by 1 and becomes 3 or more that is a predetermined value. After that, the output signal S4 of the counter 86 becomes a high level, the output of the NOT gate 88 becomes a low level, the output signal S3 of the flip-flop 84 is masked, and the gate signal S5 of the discharge transistor Mdis is fixed to a low level. As a result, the charging and discharging circuit 72 is set to the charging state, the soft start voltage Vss exceeds the first voltage level VH and increases.

At a time t5, when the soft start voltage Vss increases to a third voltage level Vth3, completion of the soft start and the striking operation is notified to other circuit block by the third comparator 90 and starting sequence is completed.

According to the inverter 100 of the preferred embodiment, an external circuit for the striking operation does not need to be provided by performing the striking operation using the soft start circuit; and therefore, it becomes possible to be small in circuit area and to be low cost.

It is to be understood to those skilled in the art that the preferred embodiment is made by way of example, various modifications are possible in the combination of their respective constituent elements and respective treatment processes, and such modifications fall within the scope of the present invention.

In the present preferred embodiment, setting of logical values of the high level and the low level of logic circuits is one example, and it is possible to freely change by appropriately inverting by the inverter or the like.

In the preferred embodiment, the description is made by the case where two inverters 100 are connected at both ends of the EEFL 210 and driven by a reverse phase driving voltage; however, the present invention is not limited to this, and the EEFL 210 whose voltage at one end is fixed may be driven by one inverter 100.

In the preferred embodiment, the soft start circuit 70 is configured by analog circuits which use the capacitor Css; however, the present invention is not limited to this, and the configuration may be made by a signal generator which generates a digital signal whose value increases or decreases in accordance with the soft start voltage Vss shown in FIG. 4 and a D/A converter which performs digital/analog conversion of an output of the signal generator.

A hysteresis comparator may be used in place of the voltage comparison unit 76 and the flip-flop 84 shown in FIG. 3, or other configuration may be used.

In the preferred embodiment, the description is made by the case where a plurality of striking operations which raise or lower the soft start voltage are performed and the first voltage level VH and the second voltage level VL are fixed to constant values respectively during the striking operations; however, either or both may be changed in response to time.

While the preferred embodiments of the present invention have been described using specific terms, such description is for illustrative purposes only, and it is to be understood that changes and variations may be made without departing from the spirit or scope of the appended claims.

What is claimed is:

1. A control circuit of an inverter which drives an external electrode fluorescent lamp connected to a secondary side of a transformer, the control circuit comprising:
   a soft start circuit which generates a soft start voltage that changes with time at a starting time of lighting the external electrode fluorescent lamp;
   a pulse modulator which receives a feedback voltage corresponding to an output voltage of the inverter and the soft start voltage, and generates a pulse signal whose duty ratio is feedback-controlled so that the feedback voltage conforms to the soft start voltage; and
   a logical control unit which performs switching control of a voltage of a primary coil of the transformer on the basis of the pulse signal from the pulse modulator, wherein
   the soft start circuit executes at least one striking operation in which the soft start voltage is raised with time, lowered when being reached to a first voltage level, and raised again when being lowered to a second voltage level smaller than the first voltage level.

2. The control circuit according to claim 1, wherein the soft start circuit is that the number of repetitions of the striking operation is selectable from a plurality of values.

3. The control circuit according to claim 1, wherein the soft start circuit includes
   a capacitor whose potential at one end is fixed;
   a charging and discharging circuit which charges and discharges the capacitor;
   a voltage comparison unit which compares the soft start voltage at the other end of the capacitor with first and second voltage levels; and
   a charging and discharging control unit which switches a charging state and a discharging state of the charging and discharging circuit on the basis of a comparison result by the voltage comparison unit,
   the charging and discharging control unit having a counter which counts the number of switchings between the charging state and the discharging state of the charging and discharging circuit on the basis of the comparison result by the voltage comparison unit.

4. The control circuit according to claim 3, wherein the charging and discharging control unit fixes the charging and discharging circuit to the charging state when a count value of the counter is a predetermined value or more.

5. The control circuit according to claim 3, wherein the voltage comparison unit includes
   a first comparator which compares the soft start voltage with the first voltage level; and
   a second comparator which compares the soft start voltage with the second voltage level, and wherein
   the charging and discharging control unit includes a flip-flop to which output signals of the first and the second comparators are inputted, switches the states of the charging and discharging circuit on the basis of an output signal of the flip-flop, and
   the counter executes counting based on the output signal of the flip-flop.

6. The control circuit according to claim 5, wherein the charging and discharging circuit includes
   a charging circuit which supplies a charging current to the capacitor; and
   a discharging circuit which is switchable to ON or OFF and withdraws a discharging current larger than the charging current from the capacitor in an ON state, and wherein
   the charging and discharging control unit performs ON/OFF control of the discharging circuit on the basis of an output signal of the counter and the output signal of the flip-flop.

7. An inverter comprising:
   a transformer;
   a control circuit according to claim 1, which performs switching control of a voltage of a primary coil of the transformer; and
   a voltage detection unit which detects an output voltage of the inverter, the voltage being generated at a secondary coil of the transformer, and outputs the feedback voltage to the control circuit in response to the output voltage.

8. A light emitting device comprising:
   an external electrode fluorescent lamp; and
   an inverter according to claim 7, which supplies an output voltage thereof to the external electrode fluorescent lamp.

9. A control method of an inverter which drives an external electrode fluorescent lamp, the control method comprising:

generating a soft start voltage which changes with time at a starting time of lighting the external electrode fluorescent lamp;

generating a pulse signal whose duty ratio is feedback-controlled so that a feedback voltage corresponding to an output voltage of the inverter conforms to the soft start voltage;

performing switching control of a voltage of a primary coil of a transformer of the inverter on the basis of the pulse signal; and repeating at least one operation which increases or decreases the soft start voltage at a starting time of lighting the external electrode fluorescent lamp.

* * * * *